UNITED STATES PATENT OFFICE.

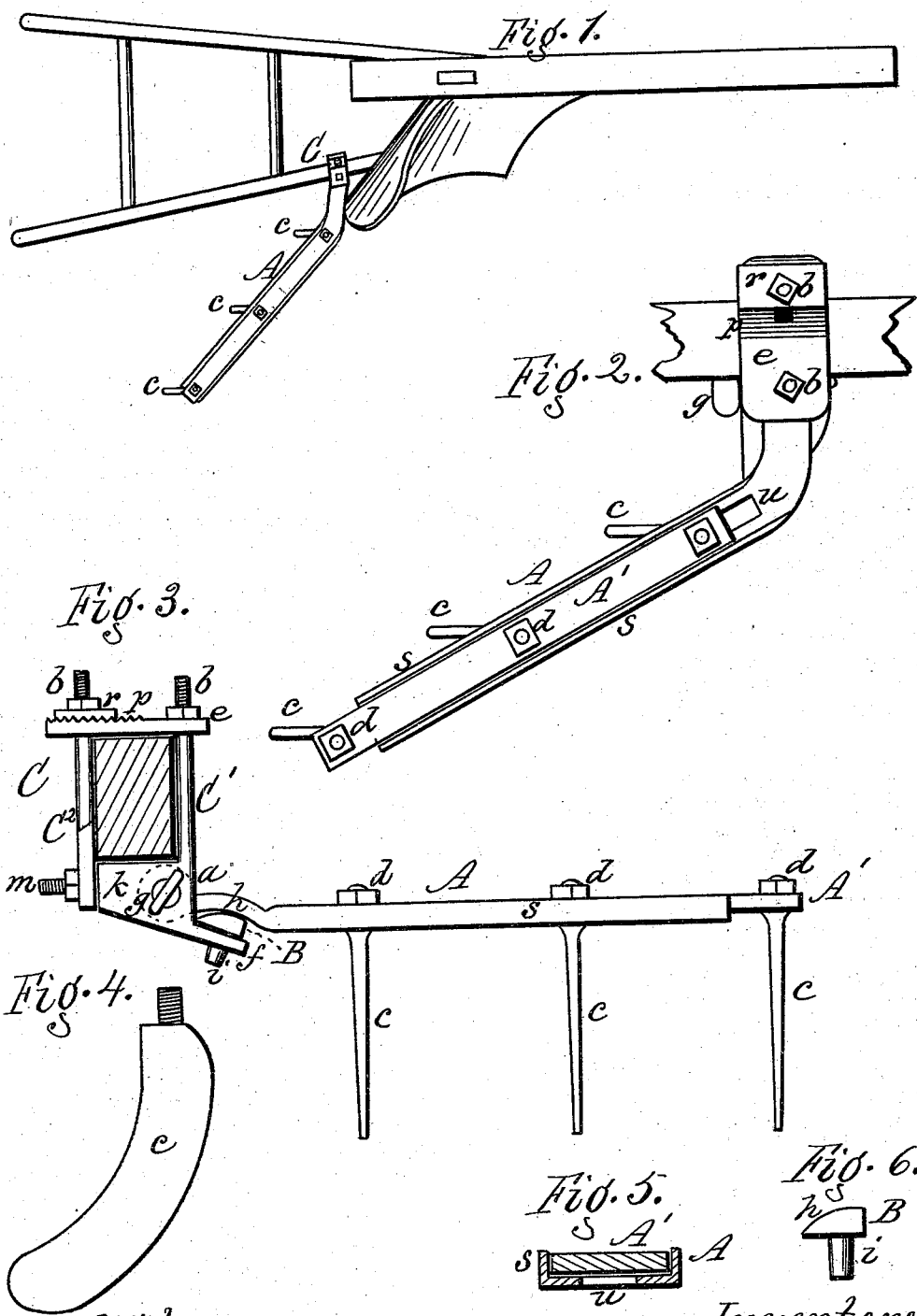

PIERSON JACOBUS AND DAVID R. AMBROSE, OF ROMULUS, NEW YORK, SAID AMBROSE ASSIGNOR TO SAID JACOBUS.

IMPROVEMENT IN HARROW ATTACHMENTS FOR PLOWS.

Specification forming part of Letters Patent No. 174,251, dated February 29, 1876; application filed March 16, 1875.

*To all whom it may concern:*

Be it known that we, PIERSON JACOBUS and DAVID R. AMBROSE, of Romulus, in the county of Seneca and State of New York, have invented a certain new and useful Improvement in Harrow Attachment for Plows; and we do hereby declare that the following is a full, clear, and exact description of the construction and operation of the same, reference being had to the accompanying drawing, in which—

Figure 1 is a plan of a plow, showing our improvement. Fig. 2 is a plan of the harrow attachment removed from place. Fig. 3 is a rear elevation of the same. Figs. 4, 5, and 6 are detail views.

This invention is an improvement on that patented by us February 2, 1875, No. 159,416.

It consists, first, in the construction of the hinged arm, whereby it may be extended or shortened at pleasure; and, second, in the combination, with the gripe and arm, of a removable gage-block for varying the height of the arm in turning the dead-furrow, all as hereinafter more fully described.

In general the construction is similar to that shown in our patent aforesaid. A is the hinged arm, attached to the gripe C by means of an eye, $a$, and screw-pin $g$. The arm stands at a backward angle, and has a set of curved teeth, $c\ c\ c$, which cut and pulverize the furrow as fast as it is turned. The attachment is secured to the plow-handle, on the furrow side, at any desired height. The gripe C is constructed in two parts, $C^1\ C^2$, each of which has a bolt, $b$, passing up through a cross-head, $e$, and is secured by a nut. The cross-head rests on top of the plow-handle. The bottom of the part $C^1$ has an offset or shoulder, $k$, which rests against the bottom of the handle. It also has a bolt, $m$, which passes through the lower end of part $C^2$, and on which screws a nut. The top of the cross-head $e$ is provided with a series of serrated teeth, $p\ p$, and with these engage corresponding teeth of a clamping-plate, $r$, on which rests the nut of the bolt $b$. This construction of the gripe is such that the gripe can fit different-sized plow-handles. It is adjustable vertically by means of the screw-bolts $b\ b$ and their nuts, and laterally by means of the clamping-plate $r$, and the screw-bolt $m$. To allow the lateral adjustment of the clamping-plate $r$, a slot has to be formed in the cross-head, as shown in Fig. 2.

The arm A is constructed with side flanges $s\ s$, and a longitudinal slot, $u$. On top or bottom of the arm, and between the flanges, rests a sliding arm, A'. The teeth $c\ c\ c$ are attached to the sliding arm by passing up through the slot $u$. By loosening the nuts $d\ d\ d$ on top, this sliding arm can be adjusted out or in, and may be clamped fast in any position by tightening the nuts again. The object of this arrangement is not to make a longer arm, but to adjust the teeth $c\ c$ with reference to the wing of the plow, so as to cut properly in line with the furrow.

We find, in different plows, that the handle on the furrow side is set in different distances from the extremity of the wing. Therefore, in some plows the inner tooth $c$ will be brought inside and behind the wing, so that it will not cut into the furrow at all, but will follow in the dead space, while in other cases the inner tooth will project out and cut too far into the furrow. The use of the sliding bar enables us to adjust the teeth exactly in all plows to cut the furrow properly.

The gripe C is provided, on the furrow side, with a projecting stop, $f$. In this, and beneath the arm A, rests a gage-block, B. This block consists of a head, $h$, and a stem, $i$. The gage-block serves to sustain the arm and prevent it from falling too low. It can be raised higher, to elevate the bar, by placing washers under its head, being thereby adjustable. It rests loosely in the hole in the stop $f$, and is therefore readily removable. In turning the dead furrow at the end of the "land," it is removed, which allows the arm to fall lower. The object of this is to allow the plow to be turned at an angle, on the land side, which is necessary in guiding the plow, as it loses its fulcrum or resistance in the dead furrow.

The device, constructed as above described, enables the work to be done with great facility.

What we claim as new, is—

1. The combination, with the handle of the plow, of the hinged arm A, and sliding arm A′, for the purpose of adjusting the teeth relatively with the wing of the plow, as shown and described.

2. The combination, with the arm A and stop $f$, of the removable gage-block B, as and for the purpose specified.

In witness whereof we have hereunto signed our names in the presence of two subscribing witnesses.

PIERSON JACOBUS.
DAVID R. AMBROSE.

Witnesses:
R. F. OSGOOD,
EDWIN B. SCOTT.